United States Patent [19]

Vietzke et al.

[11] 4,244,697
[45] Jan. 13, 1981

[54] PROCESS FOR EXPELLING URANIUM HEXAFLUORIDE HAVING A HIGH U-235 CONTENT FROM A TRANSPORTATION CYLINDER

[75] Inventors: Horst Vietzke, Maintal; Paul Börner, Freigericht; Gerhard Wagner, Rodenbach, all of Fed. Rep. of Germany

[73] Assignee: Nukem, GmbH, Hanau, Fed. Rep. of Germany

[21] Appl. No.: 859,969

[22] Filed: Dec. 12, 1977

[30] Foreign Application Priority Data

Jan. 27, 1977 [DE] Fed. Rep. of Germany ....... 2703277

[51] Int. Cl.³ .............................................. B01D 7/00
[52] U.S. Cl. .................................... 23/294 R; 423/19
[58] Field of Search ............................ 423/19; 176/30; 252/301.1 W; 23/294 R

[56] References Cited

U.S. PATENT DOCUMENTS

| | | | |
|---|---|---|---|
| 2,719,777 | 10/1955 | Lipkin et al. | 23/294 R |
| 3,925,536 | 12/1975 | Schuman | 423/19 |
| 4,036,594 | 7/1977 | Ibing et al. | 23/294 R |
| 4,115,073 | 9/1978 | Fort et al. | 252/301.1 W |
| 4,127,163 | 11/1978 | Reti | 252/301.1 W |

FOREIGN PATENT DOCUMENTS 49-27754  7/1974  Japan ........................................ 423/19

OTHER PUBLICATIONS

Powell, "Proceedings of the Second U.N. International Conference on the Peaceful Uses of Atomic Energy", vol. 4, p. 169, United Nations (1958), Geneva.

Primary Examiner—Edward A. Miller
Attorney, Agent, or Firm—Cushman, Darby & Cushman

[57] ABSTRACT

Uranium hexafluoride having a high U-235 content is driven out of a transportation container by heating in a correspondingly heated container using a halogenated hydrogen free organic liquid as the heating medium. There is also provided an apparatus for carrying out the process comprising a container having a reflux condenser and an insert for holding the transportation container closed at the bottom by condensate outlet.

11 Claims, 1 Drawing Figure

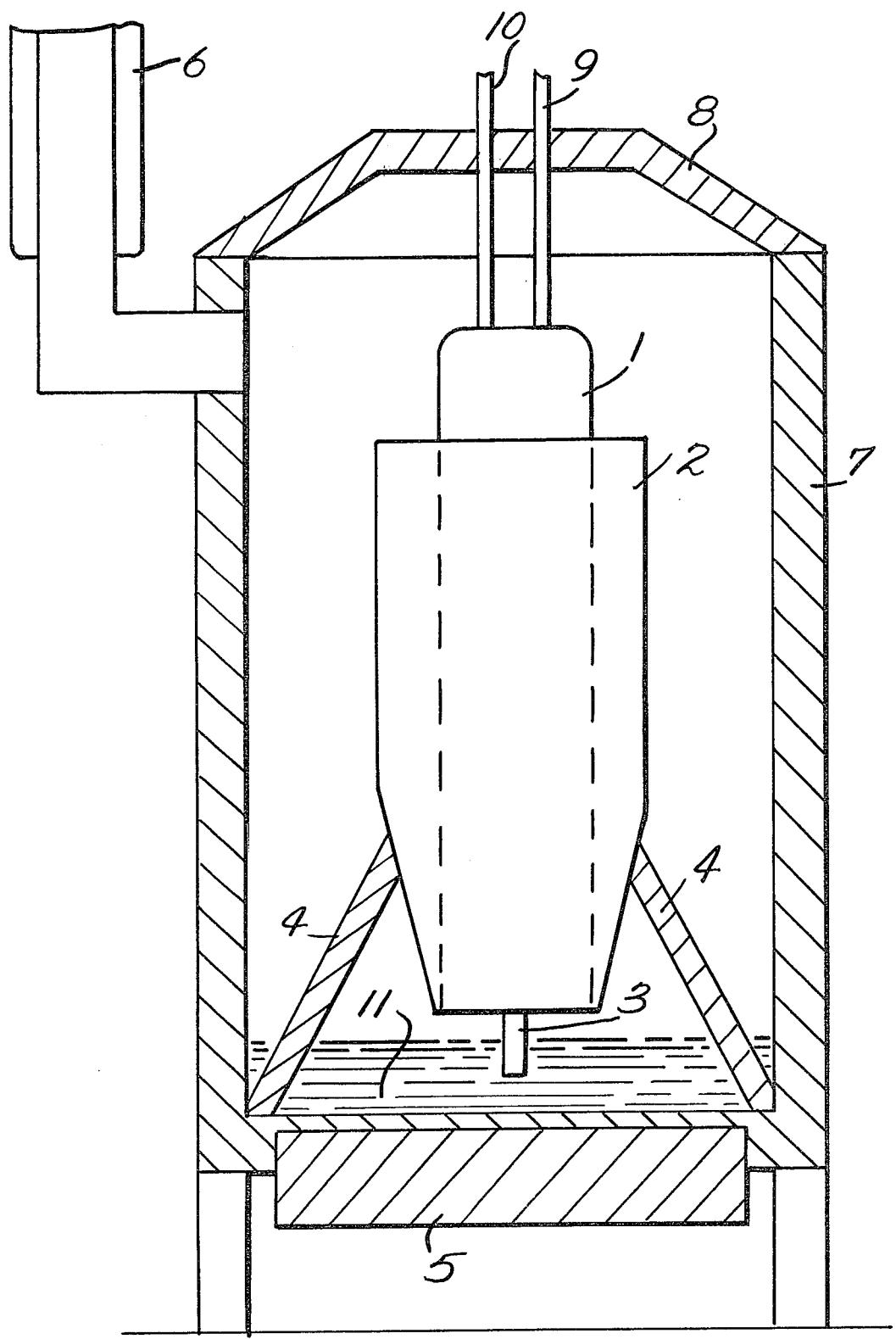

PROCESS FOR EXPELLING URANIUM HEXAFLUORIDE HAVING A HIGH U-235 CONTENT FROM A TRANSPORTATION CYLINDER

BACKGROUND OF THE INVENTION

The invention is directed to a process for expelling uranium hexafluoride having a high U-235 content from transportation containers, e.g., cylinders, and a container in which a uranium hexafluoride transportation flask containing highly enriched grades of U-235 can be heated whereby even in the case of disturbance no critical accident occurs.

Enriched uranium with high contents of U-235 are conveyed in corresponding transportation cylinders. In order to be changed into other uranium compounds the uranium hexafluoride must be driven out of this transportation cylinder and caught in a receiver. This expelling of the uranium hexafluoride takes place in so-called heatable containers in which the transportation cylinder is heated so that the uranium hexafluoride can escape in gaseous form.

For small degrees of enrichment of uranium 235 as it is used for power reactors there are known such heatable containers. With the slightly enriched degrees ($<4\%$ U-235) this can be accomplished by heating the uranium hexafluoride cylinder with saturated steam at 100° C. if the maximum amount of water in the heatable container is limited. At enrichment degrees of $<90\%$ U-235 this is no longer possible because the $UF_6$ indeed has safe geometry but the heatable container must be larger and therewith a safe geometry can no longer be guaranteed, particularly the water acts as moderator. Besides the critical uranium amount is reached in these containers already at about 810 grams while the normal cylinder, however, contains 16 kg of uranium. The driving out of the uranium hexafluoride from the transportation cylinders with high U-235 contents therefore is not possible.

It is furthermore known to provide such heatable container with an electroheater whereby the steam acting as moderator as heating agent is eliminated. However, these apparatuses have the disadvantage that the heating temperature cannot be limited and in case of disturbance the temperature may increase to such an extent that the transportation cylinder bursts.

Therefore it was the task of the present invention to find a process and apparatus with which uranium hexafluoride having a high U-235 content can be driven out of transportation containers, e.g., cylinders, without danger that a cylinder bursts or a critical accident can arise by the moderator action of the heating medium.

SUMMARY OF THE INVENTION

This problem is solved by the invention by using as heating medium halogenated, hydrogen free organic liquids. Particularly there are used perhalocarbons, especially where the halogen atoms have an atomic weight of 9 to 80, more especially 9 to 36.

The valve of the invention above all is that as the heating medium there are used only Freons or other fully halogenated organic liquids whose vapor takes care of the heat transfer and simultaneously provides for a constant temperature. There are suited all organic fluorides, chlorides and mixed compounds which do not react with uranium hexafluoride and do not contain hydrogen as moderator. In the case of a disturbing accident only the transportation cylinder can become leaky without the danger of a critical accident. Besides Freons there can be used for example carbon tetrachloride, difluorotetrachloroethane, tetrachloroethylene, hexachlorobenzene, carbon tetrabromide, 1,1,1-trifluoro-2,3,3-trichloropropylene, perfluoroheptane, perfluorooctane, perfluoro (dimethylcyclohexane) ($C_8F_{16}$), perfluoro(2,2,4-trimethylpentane), perfluorobenzene or mixtures thereof. Preferably these organic liquids have a boiling point between 70 and 230° C.

It is particularly advantageous to lead in the heating agent from above because uranium fluoride is inclined to delayed boiling whereby the cylinder easily jumps up and is torn away from the connection.

The process of the invention is advantageously carried out in a heatable container which is provided with a reflux condenser and contains an insert closed to the bottom up to the condensate outlet for holding the transportation cylinder.

In the case of a disturbance the uranium hexafluoride flowing out of the transportation cylinder which has become leaky can escape through the reflux condenser, whereupon it is dissolved in water in a washer having a safe geometry.

The insert closed at the bottom brings about that the heating medium can only flow in from above and therewith boiling delay in the uranium hexafluoride is safely avoided.

As uranium highly enriched in U-235 is intended uranium in which at least 20% of the uranium, preferably at least 90% of the uranium is present as U-235. The uranium can all be present as U-235.

The heating liquid is employed at a temperature above the sublimation temperature of $UF_6$ and up to and including the boiling point of the heating liquid.

BRIEF DESCRIPTION OF THE DRAWINGS

The process of the invention and the apparatus will be understood best in connection with the drawings wherein the single FIGURE is a schematic illustration of the apparatus.

DESCRIPTION OF THE PREFERRED EMBODIMENTS

Referring more specifically to the drawings the transportation cylinder 1 is located in an insert (holder) 2 closed at the bottom which is provided with a condensate outlet 3 and is supported in a holder 4. This holder is located in a heat insulated container 7 provided with a heater 5 and a reflux condenser 6. The container 7 is closed at the top with a cover 8 through which there only project the outlet lines 9 and 10 of the transportation cylinder 1. By switching on the heater 5 the vapors of the completely halogenated organic liquid 11 climb high on the outer wall of the insert 2 and heat up the transportation cylinder 1 from above. The condensate is returned to the heating fluid via the condensate outlet 3. The gaseous uranium hexafluoride escapes through the outlet line 9 while there can be added through the line 10 additionally an inert gas, e.g., argon.

What is claimed is:

1. A process for expelling uranium hexafluoride having a high content of U-235 out of a transportation container comprising externally heating the container containing uranium hexafluoride with a heating medium to sublime and expel the uranium hexafluoride from the container, employing as the heating medium a hydrogen free halogenated organic compound having a boiling point above the sublimation temperature of uranium hexafluoride, said heating medium being normally in the liquid form and being in an outer container, said outer container enclosing the transportation container and the heating medium, said external heating including the steps of vaporizing the liquid heating medium and applying the heated vapors from above to the outside of the transportation container.

2. A process according to claim 1 wherein said heating medium is a perhalocarbon.

3. A process according to claim 2 wherein the halogens of said perhalocarbon are selected from the group consisting of chlorine and fluorine.

4. A process according to claim 3 wherein said heating medium has a boiling point of 70° to 230° C.

5. A process according to claim 4 wherein at least a portion of the halogens are fluorine.

6. A process according to claim 1 wherein the U-235 content is >90% of the total uranium content.

7. A process according to claim 1 wherein the U-235 content is at least 20% of the total uranium content.

8. A process according to claim 7 wherein said heating medium is a perhalocarbon.

9. A process according to claim 8 wherein the halogens of said perhalocarbon are selected from the group consisting of chlorine and fluorine.

10. A process according to claim 9 wherein said heating medium has a boiling point of 70° to 230° C.

11. A process according to claim 10 wherein at least a portion of the halogens are fluorine.

* * * * *